United States Patent
Novosselov et al.

(10) Patent No.: US 10,928,297 B2
(45) Date of Patent: Feb. 23, 2021

(54) METHOD FOR DETERMINING DETECTION ANGLE OF OPTICAL PARTICLE SIZER

(71) Applicant: UNIVERSITY OF WASHINGTON, Seattle, WA (US)

(72) Inventors: Igor V. Novosselov, Seattle, WA (US); Tomas Njalsson, Reykjavik (IS)

(73) Assignee: UNIVERSITY OF WASHINGTON, Seattle, WA (US)

( * ) Notice: Subject to any disclaimer, the term of this patent is extended or adjusted under 35 U.S.C. 154(b) by 0 days.

(21) Appl. No.: 16/737,888

(22) Filed: Jan. 8, 2020

(65) Prior Publication Data

US 2020/0217775 A1 Jul. 9, 2020

Related U.S. Application Data

(60) Provisional application No. 62/790,315, filed on Jan. 9, 2019.

(51) Int. Cl.
*G01N 15/14* (2006.01)
*G01N 21/47* (2006.01)
*G01N 15/10* (2006.01)

(52) U.S. Cl.
CPC ......... *G01N 15/1434* (2013.01); *G01N 21/47* (2013.01); *G01N 2015/1087* (2013.01);
(Continued)

(58) Field of Classification Search
CPC ....... G01N 15/1434; G01N 2015/1087; G01N 21/47; G01N 2015/1445; G01N 2021/4711
(Continued)

(56) References Cited

U.S. PATENT DOCUMENTS

| 5,867,807 A | 2/1999 | Yamada et al. |
| 7,875,095 B2 | 1/2011 | Ariessohn et al. |

(Continued)

FOREIGN PATENT DOCUMENTS

| CN | 102003936 A | 4/2011 |
| CN | 103175759 A | 6/2013 |

(Continued)

OTHER PUBLICATIONS

Amaral, S. S., et al., "An Overview of Particulate Matter Measurement Instruments," Atmosphere 2015, 6(9), 1327-1345.
(Continued)

*Primary Examiner* — Tri T Ton
(74) *Attorney, Agent, or Firm* — McDonnell Boehnen Hulbert & Berghoff LLP

(57) ABSTRACT

A method includes receiving input indicating at least two of: (a) a coefficient of first sensitivity of an optical particle sizer (OPS) to a real part of a complex refractive index (CRI); (b) a coefficient of second sensitivity of the OPS to an imaginary part of the CRI; (c) a coefficient of a degree of monotonicity between intensity and particle size; (d) a coefficient of a dynamic range of the OPS; or (e) a coefficient of a limit of detection (LOD) of the OPS; determining ratings for the OPS using the at least two of (a)-(e) and at least two of (i) the first sensitivity, (ii) the second sensitivity, (iii) the degree of monotonicity, (iv) the dynamic range, or (v) the LOD; identifying an angle that corresponds to a maximum or minimum rating; and providing an OPS having a detection angle that is within 5 degrees of the identified angle.

20 Claims, 4 Drawing Sheets

(52) U.S. Cl.
CPC ............... *G01N 2015/1445* (2013.01); *G01N 2021/4711* (2013.01)

(58) Field of Classification Search
USPC ................................................ 356/335–343
See application file for complete search history.

(56) References Cited

U.S. PATENT DOCUMENTS

| | | | |
|---|---|---|---|
| 9,377,481 | B1 | 6/2016 | Greenberg et al. |
| 2013/0332032 | A1* | 12/2013 | Korn ................ B60R 21/01336 701/46 |
| 2015/0355088 | A1 | 12/2015 | Smart et al. |
| 2018/0313737 | A1 | 11/2018 | Moitzi |
| 2019/0226987 | A1 | 7/2019 | Birks et al. |
| 2019/0234862 | A1 | 8/2019 | Schladitz et al. |
| 2019/0242805 | A1 | 8/2019 | Corbett et al. |
| 2019/0258046 | A1 | 8/2019 | Gallagher-Gruber et al. |
| 2019/0277743 | A1 | 9/2019 | Wachering et al. |
| 2019/0277745 | A1 | 9/2019 | Matsuda et al. |

FOREIGN PATENT DOCUMENTS

| | | |
|---|---|---|
| CN | 2014174124 A | 9/2014 |
| CN | 104634705 A | 5/2015 |
| CN | 105335215 A | 2/2016 |
| CN | 106323920 A | 1/2017 |
| CN | 108562522 A | 9/2018 |
| CN | 109900621 A | 6/2019 |
| MX | 2018015544 A | 6/2019 |
| RU | 2690083 C1 | 5/2019 |
| WO | WO2018115052 A1 | 6/2018 |
| WO | WO2019176610 A1 | 9/2019 |

OTHER PUBLICATIONS

Austin, E., et al., "Laboratory Evaluation of the Shinyei PPD42NS Low-Cost Particulate Matter Sensor," Plos One, 2015. 10(9): p. e0137789.

Bachalo, W.D., "Method for measuring the size and velocity of spheres by dual-beam light-scatter interferometry," Applied optics, 1980. 19(3): p. 363-370.

Beaucage, G., et al., "Particle size distributions from small-angle scattering using global scattering functions," J. Appl. Cryst. (2004). 37, 523-535.

Beelen, R., et al., "Long-Term Effects of Traffic-Related Air Pollution on Mortality in a Dutch Cohort (NLCS-AIR Study)," Environmental Health Perspectives, 2008. 116(2): p. 196-202.

Boose, Y., et al., "Ice Nucleating Particle Measurements at 241 K during Winter Months at 3580 m MSL in the Swiss Alps," Journal of the Atmospheric Sciences, 2016. 73(5): p. 2203-2228.

Brown, J.S., et al., "Ultrafine Particle Deposition and Clearance in the Healthy and Obstructed Lung," Am J Respir Crit Care Med, 2002. 166(9): p. 1240-7.

Burkart, J., et al., "Characterizing the performance of two optical particle counters (Grimm OPC1.108 and OPC1.109) under urban aerosol conditions," Journal of Aerosol Science, vol. 41, Issue 10, Oct. 2010, pp. 953-962.

Chakrabarti, B., et al., "Performance evaluation of the active-flow personal DataRAM PM2.5 mass monitor (Thermo Anderson pDR-1200) designed for continuous personal exposure measurements," Atmospheric Environment, vol. 38, Issue 20, Jun. 2004, pp. 3329-3340.

Cohen et al., A.J., et al., "Urban Air Pollution," Comparative Quantification of Health Risks: Global and Regional Burden of Disease Attributable to Selected Major Risk Factors, 2004. 2: p. 1353-1433.

Damit, B., "Droplet-Based Microfluidics Detector for Bioaerosol Detection," Aerosol Science and Technology, 2017. 51(4): p. 488-500.

Ebert, M., et al., "The chemical composition and complex refractive index of rural and urban influenced aerosols determined by individual particle analysis," Atmospheric Environment, 2004. 38(38): p. 6531-6545.

Eidhammer, T., et al., "Determination of index of refraction and size of supermicrometer particles from light scattering measurements at two angles," Journal of Geophysical Research: Atmospheres, 2008. 113(D16).

Elbayoumi, M., et al., "Spatial and temporal variations in particulate matter concentrations in twelve schools environment in urban and overpopulated camps landscape," Building and Environment, 2015. 90: p. 157-167.

EPA, 40 CFR Parts 50—Reference Methods for the Determination of Fine Particulate Matter as PM2.5 in the Atmosphere (Appendix L), EPA, Editor 1997a.

Eremin, A., et al., "Size dependence of complex refractive index function of growing nanoparticles," Applied Physics B vol. 104, pp. 285-295 (2011).

Eshel, G., et al., "Critical Evaluation of the Use of Laser Diffraction for Particle-Size Distribution Analysis," Soil Science Society of America Journal, vol. 68, Issue 3, May 2004, pp. 736-743.

Gao, M., et al., "A distributed network of low-cost continuous reading sensors to measure spatiotemporal variations of PM2.5 in Xi'An, China," Environmental Pollution, 2015. 199: p. 56-65.

Gao, R. S., et al., "A High-Sensitivity Low-Cost Optical Particle Counter Design," Aerosol Science and Technology, 47 (2), 137-145, (2013).

Gayet, J. F., et al., "A new airborne polar Nephelometer for the measurements of optical and microphysical cloud properties. Part I: Theoretical design," Ann. Geophysicae 15, 451-459 (1997).

Goo, J., "Numerical simulation of aerosol concentration at atmospheric pressure by a cascade of aerodynamic slit lenses," Aerosol Science 33 (2002) 1493-1507.

Grams, G., et al., "Complex Index of Refraction of Airborne Soil Particles," Journal of Applied Meteorology, 1974. 13(4): p. 459-471.

Grimm, H., et al., "Aerosol Measurement: The Use of Optical Light Scattering for the Determination of Particulate Size Distribution, and Particulate Mass, Including the Semi-Volatile Fraction," Journal of the Air & Waste Management Association, vol. 59, 2009, Issue 1, pp. 101-107, Published online: Jan. 24, 2012.

He, J., et al., "Design and evaluation of an aerodynamic focusing micro-well aerosol collector," Aerosol Science and Technology, 2017. 51(9): p. 1016-1026.

Hull, P., et al., "Modeling light scattering from Diesel soot particles," Applied Optics vol. 43, Issue 17, pp. 3433-3441 (2004).

Kobayashi, H. et al., "Development of a polarization optical particle counter capable of aerosol type classification," Atmospheric Environment, 97, 486-492, (2014).

Krewski, D., et al. "Extended Follow-Up and Spatial Analysis of the American Cancer Society Study Linking Particulate Air Pollution and Mortality," Res Rep Health Eff Inst, 2009(140): p. 5-114; discussion 115-36.

Krewski, D., et al., "Overview of the Reanalysis of the Harvard Six Cities Study and American Cancer Society Study of Particulate Air Pollution and Mortality," J Toxicol Environ Health A, 2003. 66(16-19): p. 1507-51.

Liu B. Y., et al., "Experimental Studies of Optical Particle Counters," Atmospheric Environment (1967), 1974. 8(7): p. 717-732.

Liu, Y., et al., "The Effect of Refractive Index on Size Distributions and Light Scattering Coefficients Derived from Optical Particle Counters," Journal of Aerosol Science, 2000, 31(8): p. 945-957.

Lurton T. et al., "Light scattering at small angles by atmospheric irregular particles: modelling and laboratory—measurements," Atmospheric Measurement Techniques, 2014, 7(4): p. 931.

Marple, V. A., et al., "Virtual Impactors: A Theoretical Study," Environmental science & technology, 1980, 14(8): p. 976-985.

Mie, G., "Beiträge zur Optik tither Medien, speziell kolloidaler Metallösungen," Annalen der Physik, 1908, 330(3): p. 377-445.

Mullaney, P., et al., "Cell Sizing: a Small-Angle Light-Scattering Method for Sizing Particles of Low Relative Refractive Index," Applied optics, 1969, 8(11): p. 2361-2362.

(56) References Cited

OTHER PUBLICATIONS

Müller, D., et al., "Comprehensive particle characterization from three-wavelength Raman-lidar observations: case study" Applied Optics vol. 40, Issue 27, pp. 4863-4869 (2001).
Munoz, O., et al., "Experimental light scattering matrices from the Amsterdam Light Scattering Database," In Light scattering reviews. 2006, Springer p. 3-29.
Nagy, A., et al., "Numerical and experimental study of the performance of the dual wavelength optical particle spectrometer (DWOPS)," Journal of Aerosol Science, 2007, 38(4): p. 467-478.
Njalsson, T., et al., "Design and optimization of a compact low-cost optical particle sizer," Journal of Aerosol Science, vol. 119, May 2018, pp. 1-12.
Novosselov, I. V., et al., "Rectangular Slit Atmospheric Pressure Aerodynamic Lens Aerosol Concentrator," Aerosol Science and Technology, 2014. 48(2): p. 163-172.
Patel, M. M., et al., "Spatial and Temporal Variations in Traffic-related Particulate Matter at New York City High Schools," Atmospheric environment (Oxford, England : 1994), 2009, 43(32): p. 4975-4981.
Pope, C. A., et al., "Health Effects of Fine Particulate Air Pollution: Lines that Connect," J Air Waste Manag Assoc, 2006, 56(6): p. 709-42.
Pope, C. A., et al., "Lung Cancer, Cardiopulmonary Mortality, and Long-term Exposure to Fine Particulate Air Pollution," Jama, 2002, 287(9): p. 1132-41.
Pope, C. A., et al., "Particulate Air Pollution as a Predictor of Mortality in a Prospective Study of U.S. Adults," Am J Respir Crit Care Med, 1995, 151(3 Pt 1): p. 669-74.
Price, H.D., et al., "Comparison of instruments for particle number size distribution measurements in air quality monitoring," Journal of Aerosol Science, vol. 76, Oct. 2014, pp. 48-55.
Raul J. C., et al., "Vertical profiles of urban aerosol complex refractive index in the frame of ESQUIF airborne measurements," Atmos. Chem. Phys., 2008, 8(4): p. 901-919.
Renard, J. B., et al., "LOAC: a small aerosol optical counter/sizer for ground-based and balloon measurements of the size distribution and nature of atmospheric particles—Part 1: Principle of measurements and instrument evaluation," Atmos. Meas. Tech., 2016, 9(4): p. 1721-1742.
Renard, J. B., et al., "Small-angle light scattering by airborne particulates: Environment S.A. continuous particulate monitor," Measurement Science and Technology, 2010, 21(8): p. 085901.
Samet, J. M., et al., "Fine Particulate Air Pollution and Mortality in 20 U.S. Cities, 1987-1994," N Engl J Med, 2000, 343(24): p. 1742-1749.
Schwartz, J., et al., "Fine Particles Are More Strongly Associated Than Coarse Particles with Acute Respiratory Health Effects in Schoolchildren," Epidemiology, 2000, 11(1): p. 6-10.
Seto, E., et al. "Use of low-cost particle monitors to calibrate traffic-related air pollutant models in urban areas," in International Environmental Modelling and Software Society. 2014.
Shettle, E. P., et al., "Models for the Aerosols of the Lower Atmosphere and the Effects of Humidity Variations on Their Optical Properties," AFGL-TR-79-0214, 1979, 675: p. 94.
Sousan, S., et al., "Inter-comparison of low-cost sensors for measuring the mass concentration of occupational aerosols," Aerosol Science and Technology, 2016, 50(5): p. 462-473.
Spindler, C., et al., "Retrieval of Aerosol Complex Refractive Index by Combining Cavity Ring Down Aerosol Spectrometer Measurements with Full Size Distribution Information," Aerosol Science and Technology, vol. 41, 2007, Issue 11, pp. 1011-1017 | Received Apr. 27, 2007, Accepted Sep. 13, 2007, Published online: Nov. 6, 2007.
Szymanski, W. W., et al., "A new method for the simultaneous measurement of aerosol particle size, complex refractive index and particle density," Published Feb. 8, 2002, Measurement Science and Technology, vol. 13, No. 3.
Szymanski, W. W., et al., "Optical particle spectrometry—Problems and prospects," Journal of Quantitative Spectroscopy and Radiative Transfer, 2009, 110(11): p. 918-929.
Szymanski, W. W., et al., "Optimized response characteristics of an optical particle spectrometer for size measurement of aerosols," Journal of Quantitative Spectroscopy and Radiative Transfer, vol. 64, Issue 1, Jan. 2000, pp. 75-86.
The European Parliament and the Council of the European Union, "Directive 2008/50/EC of the European Parliament and of the Council of May 21, 2008 on ambient air quality and cleaner air for Europe," in 152, EU, Editor. 2008, Official J. p. 1-44.
The PARIS Simulation Framework, Signal Processing and Speech Communication Laboratory, <https://www.spsc.tugraz.at/databases-and-tools/paris-simulation-framework.html> 3 pages, printed Jul. 16, 2020.
Volten, H., et al., "Scattering matrices and reflectance spectra of forsterite particles with different size distributions," Journal of Quantitative Spectroscopy and Radiative Transfer, 2006. 100(1): p. 429-436.
Wang, Y. et al. "Laboratory Evaluation and Calibration of Three Low Cost Particle Sensors for Particulate Matter Measurement," Aerosol Science and Technology, 49(11), 1063-1077, (2015).

\* cited by examiner $$Q_i(\theta_i) = K_1 \frac{\sigma(R(Re(CRI),\theta_i))}{\mu(R(Re(CRI),\theta_i))} + K_2 \frac{\sigma(R(Im(CRI),\theta_i))}{\mu(R(Im(CRI),\theta_i))}$$
$$+ K_3 M + K_4 \frac{\max(R)}{\min(R)} + K_5 R(d_{min})$$

```
┌─────────────────────────────────────────────────┐
│  RECEIVING INPUT INDICATING AT LEAST TWO OF (A) │
│   FIRST COEFFICIENT CORRESPONDING TO FIRST      │
│   SENSITIVITY OF OPTICAL PARTICLE SIZER (OPS),  │
│   (B) SECOND COEFFICIENT CORRESPONDING TO       │
│   SECOND SENSITIVITY OF OPS, (C) THIRD          │
│   COEFFICIENT CORRESPONDING TO DEGREE OF        │
│   MONOTONICITY BETWEEN SCATTERING INTENSITY     │
│   DETECTED BY OPS AND SIZE OF PARTICLE UNDER    │
│   TEST, (D) FOURTH COEFFICIENT CORRESPONDING    │
│   TO DYNAMIC RANGE OF OPS, OR (V) FIFTH         │
│   COEFFICIENT CORRESPONDING TO LIMIT OF         │
│   DETECTION (LOD) OF OPS                        │
└─────────────────────────────────────────────────┘
 402
          │
          ▼
┌─────────────────────────────────────────────────┐
│ DETERMINING PLURALITY OF RATINGS FOR OPS USING  │
│ AT LEAST TWO OF (A)-(E) AND AT LEAST TWO OF (I) │
│ FIRST SENSITIVITY, (II) SECOND SENSITIVITY,     │
│ (III) DEGREE OF MONOTONICITY, (IV) DYNAMIC      │
│ RANGE, OR (V) LOD                               │
└─────────────────────────────────────────────────┘
 404
          │
          ▼
┌─────────────────────────────────────────────────┐
│ IDENTIFYING DETECTION ANGLE OF PLURALITY OF     │
│ DETECTION ANGLES THAT CORRESPONDS TO MAXIMUM    │
│ RATING OF PLURALITY OF RATINGS OR MINIMUM       │
│ RATING OF PLURALITY OF RATINGS                  │
└─────────────────────────────────────────────────┘
 406
          │
          ▼
┌─────────────────────────────────────────────────┐
│  PROVIDING OPS HAVING DETECTION ANGLE THAT IS   │
│  WITHIN 5 DEGREES OF IDENTIFIED DETECTION ANGLE │
└─────────────────────────────────────────────────┘
 408
```

FIG. 4     400

METHOD FOR DETERMINING DETECTION ANGLE OF OPTICAL PARTICLE SIZER

CROSS REFERENCE TO RELATED APPLICATION

This application claims priority to U.S. Provisional Application No. 62/790,315, filed on Jan. 9, 2019, the contents of which are hereby incorporated by reference in their entirety.

STATEMENT REGARDING FEDERALLY SPONSORED RESEARCH OR DEVELOPMENT

This invention was made with government support under Grant Nos. R21 ES024715 and U01 EB021923, awarded by the National Institutes of Health. The government has certain rights in the invention.

BACKGROUND

Measurements of ambient particle concentrations and size can be of importance in applications such as personal exposure assessments, air quality studies, and pollution monitoring. Conventional instruments for detecting particle concentration and/or size can be relatively large and expensive, making them somewhat impractical for use as personal monitors. Additionally, many conventional instruments are sensitive to small variations in the complex refractive index (CRI) of particles. Also, the scattered light intensity can exhibit non-monotonic size dependence with respect to CRI. This can create uncertainty when sizing particles with unknown CRI, which is typical in many environmental monitoring and personal exposure assessments. These and other applications could benefit from instruments that are compact and inexpensive, yet reliable and accurate.

SUMMARY

In one aspect, the disclosure includes a method comprising: receiving input indicating at least two of: (a) a first coefficient corresponding to a first sensitivity of an optical particle sizer (OPS) to a real part of a complex refractive index (CRI) of a particle under test, wherein the first sensitivity is dependent on a detection angle defined by a central axis of the OPS and a detection axis of a detector of the OPS; (b) a second coefficient corresponding to a second sensitivity of the OPS to an imaginary part of the CRI, wherein the second sensitivity is dependent on the detection angle; (c) a third coefficient corresponding to a degree of monotonicity between scattering intensity detected by the OPS and a size of the particle under test, wherein the degree of monotonicity is dependent on the detection angle; (d) a fourth coefficient corresponding to a dynamic range of the OPS, wherein the dynamic range is dependent on the detection angle; or (e) a fifth coefficient corresponding to a limit of detection (LOD) of the OPS, wherein the LOD is dependent on the detection angle; determining a plurality of ratings for the OPS using the at least two of (a)-(e) and at least two of (i) the first sensitivity, (ii) the second sensitivity, (iii) the degree of monotonicity, (iv) the dynamic range, or (v) the LOD, wherein the plurality of ratings correspond respectively to a plurality of detection angles; identifying a detection angle of the plurality of detection angles that corresponds to a maximum rating of the plurality of ratings or a minimum rating of the plurality of ratings; and providing an OPS having a detection angle that is within 5 degrees of the identified detection angle.

In another aspect, the disclosure includes a computing device comprising: one or more processors; and a computer readable medium storing instructions that, when executed by the one or more processors, cause the computing device to perform functions comprising: receiving input indicating at least two of: (a) a first coefficient corresponding to a first sensitivity of an optical particle sizer (OPS) to a real part of a complex refractive index (CRI) of a particle under test, wherein the first sensitivity is dependent on a detection angle defined by a central axis of the OPS and a detection axis of a detector of the OPS; (b) a second coefficient corresponding to a second sensitivity of the OPS to an imaginary part of the CRI, wherein the second sensitivity is dependent on the detection angle; (c) a third coefficient corresponding to a degree of monotonicity between scattering intensity detected by the OPS and a size of the particle under test, wherein the degree of monotonicity is dependent on the detection angle; (d) a fourth coefficient corresponding to a dynamic range of the OPS, wherein the dynamic range is dependent on the detection angle; or (e) a fifth coefficient corresponding to a limit of detection (LOD) of the OPS, wherein the LOD is dependent on the detection angle; determining a plurality of ratings for the OPS using the at least two of (a)-(e) and at least two of (i) the first sensitivity, (ii) the second sensitivity, (iii) the degree of monotonicity, (iv) the dynamic range, or (v) the LOD, wherein the plurality of ratings correspond respectively to a plurality of detection angles; and identifying a detection angle of the plurality of detection angles that corresponds to a maximum rating of the plurality of ratings or a minimum rating of the plurality of ratings.

In another aspect, the disclosure includes a non-transitory computer readable medium storing instructions that, when executed by a computing device, cause the computing device to perform functions comprising: receiving input indicating at least two of: (a) a first coefficient corresponding to a first sensitivity of an optical particle sizer (OPS) to a real part of a complex refractive index (CRI) of a particle under test, wherein the first sensitivity is dependent on a detection angle defined by a central axis of the OPS and a detection axis of a detector of the OPS; (b) a second coefficient corresponding to a second sensitivity of the OPS to an imaginary part of the CRI, wherein the second sensitivity is dependent on the detection angle; (c) a third coefficient corresponding to a degree of monotonicity between scattering intensity detected by the OPS and a size of the particle under test, wherein the degree of monotonicity is dependent on the detection angle; (d) a fourth coefficient corresponding to a dynamic range of the OPS, wherein the dynamic range is dependent on the detection angle; or (e) a fifth coefficient corresponding to a limit of detection (LOD) of the OPS, wherein the LOD is dependent on the detection angle; determining a plurality of ratings for the OPS using the at least two of (a)-(e) and at least two of (i) the first sensitivity, (ii) the second sensitivity, (iii) the degree of monotonicity, (iv) the dynamic range, or (v) the LOD, wherein the plurality of ratings correspond respectively to a plurality of detection angles; and identifying a detection angle of the plurality of detection angles that corresponds to a maximum rating of the plurality of ratings or a minimum rating of the plurality of ratings.

In another aspect, the disclosure includes an optical particle sizer (OPS) comprising: a light source configured to emit collimated light along a central axis of the OPS; a conduit configured for guiding particles across the collimated light such that the particles scatter the collimated light; and a detector configured for detecting the light scattered by the particles and aligned to form a detection angle defined by the central axis and a detection axis of the detector, wherein the detection angle is greater than 43 degrees and less than 53 degrees.

When the term "substantially" or "about" is used herein, it is meant that the recited characteristic, parameter, or value need not be achieved exactly, but that deviations or variations, including, for example, tolerances, measurement error, measurement accuracy limitations, and other factors known to those of skill in the art may occur in amounts that do not preclude the effect the characteristic was intended to provide. In some examples disclosed herein, "substantially" or "about" means within +/−0-5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

BRIEF DESCRIPTION OF THE DRAWINGS

FIG. 4 is a block diagram of a method, according to an example embodiment.

DETAILED DESCRIPTION

Figure 1:
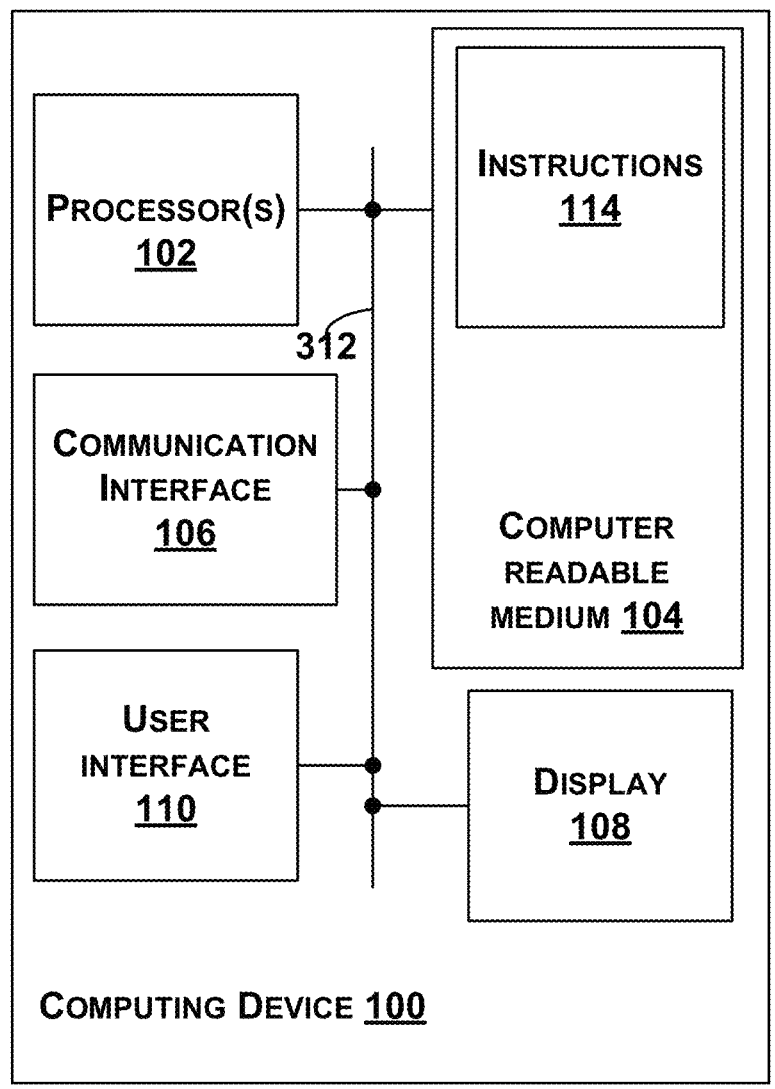
FIG. 1 is a block diagram a computing device, according to an example embodiment.

As discussed above, a need exists for an OPS that is compact and inexpensive, yet reliable and accurate. As such, methods for determining a detection angle for an OPS and an OPS having a detection angle determined with such methods are disclosed herein.

Within examples, a method includes receiving input (e.g., via a user interface) indicating at least two of the coefficients (a)-(e) discussed below. The coefficients (a)-(e) can be used to weight various factors that are relevant for determining a desirable detection angle of the OPS. That is, the relative magnitudes of (a)-(e) can generally be considered an expression of how important the respective factors are in determining a desirable detector angle for the OPS for a given use case. For example, the coefficients (a)-(e) may vary based on the environment that the OPS will be used in and/or based on the known or unknown qualities of the particles the OPS is expected to detect.

The coefficient (a) is a first coefficient corresponding to a first sensitivity of an optical particle sizer (OPS) to a real part of a complex refractive index (CRI) of a particle under test (e.g., particles of different materials). The first sensitivity is dependent on a detection angle defined by a central axis of the OPS and a detection axis of a detector of the OPS. The coefficient (b) is a second coefficient corresponding to a second sensitivity of the OPS to an imaginary part of the CRI. The second sensitivity is also dependent on the detection angle. The coefficient (c) is a third coefficient corresponding to a degree of monotonicity between scattering intensity detected by the OPS and a size of the particle under test. The degree of monotonicity is also dependent on the detection angle. The coefficient (d) is a fourth coefficient corresponding to a dynamic range of the OPS. The dynamic range is also dependent on the detection angle. The coefficient (e) is a fifth coefficient corresponding to a limit of detection (LOD) of the OPS. The LOD is also dependent on the detection angle. Detection angle dependent functions defining the first sensitivity, the second sensitivity, the degree of monotonicity, the dynamic range, and the LOD are typically calculated using equations based on laws of physics.

The method also includes determining (e.g., calculating) a plurality of (e.g., numerical) ratings for the OPS using the at least two of the coefficients (a)-(e) and at least two of (i) the first sensitivity, (ii) the second sensitivity, (iii) the degree of monotonicity, (iv) the dynamic range, or (v) the LOD. The plurality of ratings correspond respectively to a plurality of detection angles. Determining the plurality of ratings can involve calculating a weighted sum of the at least two of (i)-(v) multiplied by their respective coefficients (a)-(e), but other examples are possible.

The method also includes identifying a detection angle of the plurality of detection angles that corresponds to a maximum rating of the plurality of ratings or a minimum rating of the plurality of ratings (e.g., depending on the sign of the coefficients). The method also includes providing (e.g., building) an OPS having a detection angle that is within 5 degrees of the identified detection angle. An OPS having a detection angle determined using the above method will tend to have performance characteristics that are somewhat tailored to the projected use case.

FIG. 1 is a block diagram a computing device 100. In some examples, components of the computing device 100 are distributed across multiple computing devices. However, for the sake of example, the components are shown and described as part of the computing device 100. The computing device 100 can be or include a mobile device (such as a mobile phone), a desktop computer, a laptop computer, a tablet computer, a server, a network of multiple servers, or similar device(s) that can be configured to perform the functions described herein.

As shown in FIG. 1, the computing device 100 includes one or more processors 102, a non-transitory computer readable medium 104, a communication interface 106, a display 108, and a user interface 110. Components of the computing device 100 illustrated in FIG. 1 are linked together by a system bus, network, or other connection mechanism 312.

The one or more processors 102 can be any type of processor(s), such as a microprocessor, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can be configured to store instructions 114. The instructions 114 are executable by the one or more processors 102 to cause the computing device 100 to perform any of the functions of the computing device 100 described herein. For example, the instructions 114 can include instructions for identifying a detection angle for an OPS, as described below.

The communication interface 106 can include hardware to enable communication within the computing device 100 and/or between the computing device 100 and one or more other devices. The hardware can include transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices.

The display 108 can be any type of display component configured to display data. As one example, the display 108 can include a touchscreen display. As another example, the display 108 can include a flat-panel display, such as a liquid-crystal display (LCD) or a light-emitting diode (LED) display.

The user interface 110 can include one or more pieces of hardware used to provide data and control signals to the computing device 100. For instance, the user interface 110 can include a mouse or a pointing device, a keyboard or a keypad, a microphone, a touchpad, or a touchscreen, among other possible types of user input devices. Generally, the user interface 110 can enable an operator to interact with a graphical user interface (GUI) provided by the computing device 100 (e.g., displayed by the display 108).

Figure 2:
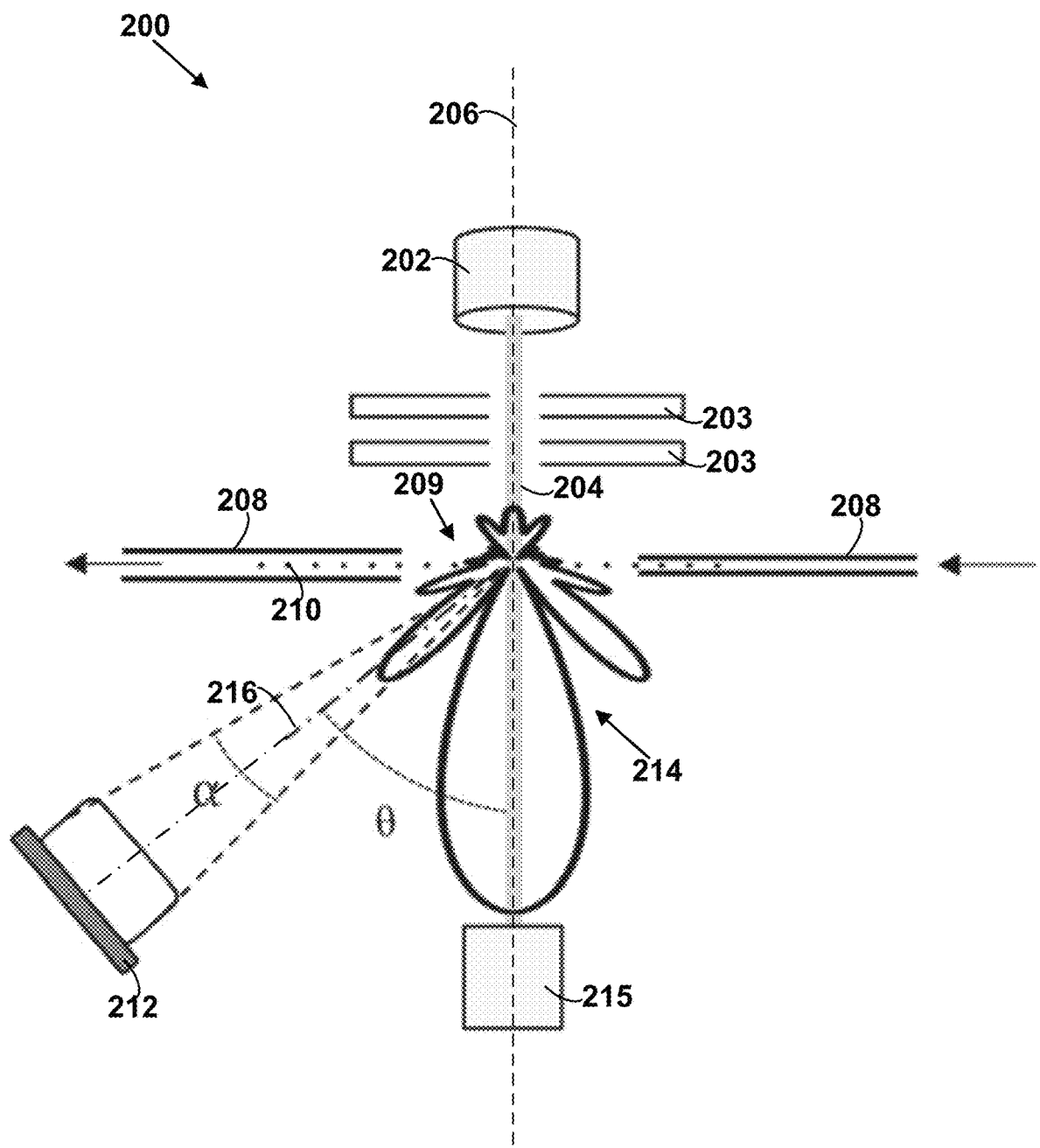
FIG. 2 is a schematic diagram of an optical particle sizer, according to an example embodiment.

FIG. 2 shows an optical particle sizer (OPS) 200 that includes a light source 202 configured to emit collimated light 204 along a central axis 206 of the OPS 200. The OPS 200 also includes a conduit 208 configured for guiding particles 210 across the collimated light 204 such that the particles 210 scatter the collimated light 204. The OPS 200 also includes a detector 212 configured for detecting the light 214 scattered by the particles 210 and aligned to form a detection angle θ defined by the central axis 206 and a detection axis 216 of the detector 212. In one example, the detection angle θ is greater than 43 degrees and less than 53 degrees. In other examples, the detection angle θ can be any angle that is greater than zero degrees and less than 180 degrees (e.g., between zero degrees and 90 degrees).

The light source 202 is typically a laser. The apertures 203 are generally light absorbing plates of material that have a hole through which the collimated light 204 can pass.

The collimated light 204 is generally emitted by the light source 202 in parallel with the central axis 206 and into a beam dump 215. The central axis 206 is generally an axis of symmetry for the light source 202, the apertures 203, the collimated light 204, and the beam dump 215.

The conduit 208 is generally a metal or plastic tube, but other examples are possible. The conduit 208 includes an opening 209 that allows the collimated light 204 to pass through the opening 209 and be scattered by the particles 210. The opening 209 also allows some of the light 214 scattered by the particles 210 to reach the detector 212. Air and ambient particles 210 are typically forced through the conduit 208 and across the collimated light 204 by a pump or some other means of generating a suitable air pressure gradient.

The particles 210 can include particles of any solid material. The particles 210 will typically have diameters ranging 0.1 μm to 10 μm, but other examples are possible.

The detector 212 typically takes the form of a photodetector or a photomultiplier tube. The signal generated by the detector 212 can be amplified if needed.

The light 214 scattered by the particles 210 will typically be incoherent, due to being scattered by the particles 210.

The beam dump 215 generally includes a block of light absorbing material that is configured to absorb some of the collimated light 204.

The detection axis 216 is defined by a vector that is normal to a surface of the detector 212. That vector is generally centered on the detector 212 and intersects the point where particles cross the collimated light 204. In some examples, the detector 212 is adjustable between two or more positions with respect to the OPS 200 such that the OPS 200 has two or more respective detection angles θ that can be selected. In some examples, the detection angle θ can be adjusted to be equal to any value between 0 degrees to 180 degrees (e.g., 0 degrees to 90 degrees).

Figure 3:
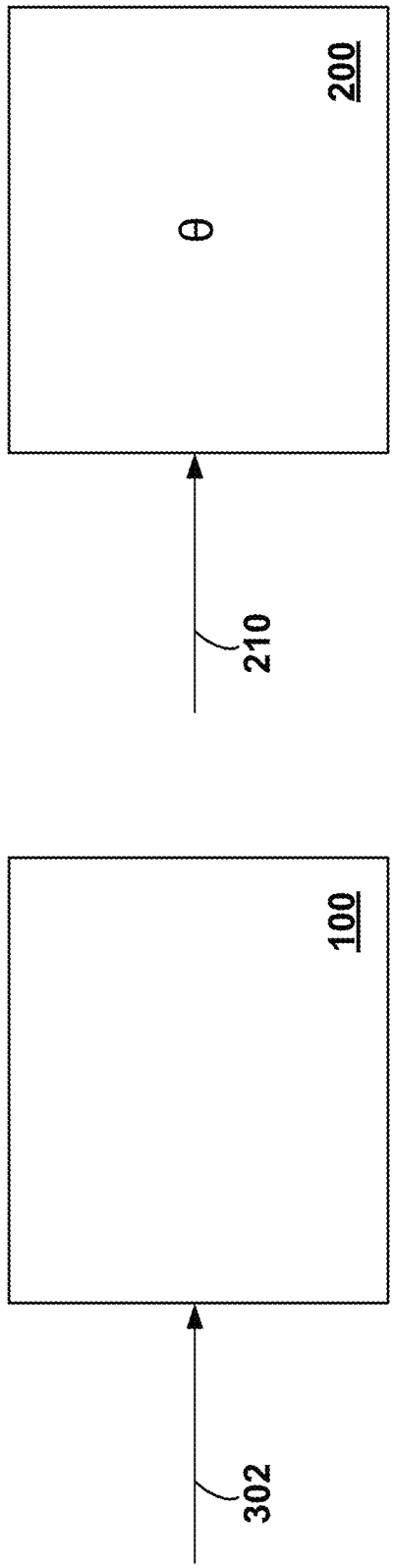
FIG. 3 shows an equation that defines relationships between various variables and functions, according to an example embodiment.

FIG. 3 shows an equation 300 that defines relationships between various variables and functions related to this disclosure. Below is a glossary for the variables and functions of FIG. 3.

| Variable/Function | Definition |
|---|---|
| $Q_i$ | rating calculated for $\theta_i$ |
| $\theta_i$ | detection angle |
| $K_1$ | first coefficient |
| R | scattering intensity |
| $\sigma(R(Re(CRI), \theta_i))$ | standard deviation of scattering intensity with respect to the real part of CRI |
| $\mu(R(Re(CRI), \theta_i))$ | mean of scattering intensity with respect to the real part of CRI |
| $\dfrac{\sigma(R(Re(CRI), \theta_i))}{\mu(R(Re(CRI), \theta_i))}$ | first sensitivity (also referred to as $S_1$) |
| $K_2$ | second coefficient |
| $\sigma(R(Im(CRI), \theta_i))$ | standard deviation of scattering intensity with respect to the imaginary part of CRI |
| $\mu(R(Im(CRI), \theta_i))$ | mean of scattering intensity with respect to the imaginary part of CRI |
| $\dfrac{\sigma(R(Im(CRI), \theta_i))}{\mu(R(Im(CRI), \theta_i))}$ | second sensitivity (also referred to as $S_2$) |
| $K_3$ | third coefficient |
| M | degree of monotonicity (e.g., a quantity of instances of non-monotonicity over a finite range of particle size) |
| $K_4$ | fourth coefficient |
| max(R) | maximum of the scattering intensity over a finite range of particle size, a finite range of the real part of the CRI, and a finite range of the imaginary part of the CRI |
| min(R) | minimum of the scattering intensity over a finite range of particle size, a finite range of the real part of the CRI, and a finite range of the imaginary part of the CRI |
| $\dfrac{max(R)}{min(R)}$ | dynamic range (DR) |
| $K_5$ | fifth coefficient |
| $R(d_{min})$ | limit of detection (LOD) (e.g., a minimum scattering intensity that corresponds to a minimum particle size of the finite range of particle size, over the finite range of the real part of the CRI and over the finite range of the imaginary part of the CRI) |

FIG. 3 also shows the computing device 100 receiving an input 302 (e.g., via a user interface). The input 302 indicates (e.g., provides values for) at least two of the coefficients $K_1$-$K_5$ described above. That is, in various embodiments, the input 302 can indicate values for any two, any three, any four, or all five of the coefficients $K_1$-$K_5$. The at least two of the coefficients $K_1$-$K_5$ can be used to determine a plurality of ratings of the OPS 200, as discussed below.

The first coefficient $K_1$ corresponds to a first sensitivity $S_1$ of the optical particle sizer (OPS) 200 to a real part of a complex refractive index (CRI) of the particle 210 under test. The first sensitivity $S_1$ is dependent on the detection angle θ defined by the central axis of the OPS 200 and the detection axis of the detector of the OPS 200.

The second coefficient $K_2$ corresponds to a second sensitivity $S_2$ of the OPS 200 to an imaginary part of the CRI of the particle 210 under test. The second sensitivity $S_2$ is also dependent on the detection angle θ.

The third coefficient $K_3$ corresponds to a degree of monotonicity M between the scattering intensity R detected by the OPS 200 and a size (e.g., diameter 'd') of the particle 210 under test. The degree of monotonicity M is also dependent on the detection angle θ.

The fourth coefficient $K_4$ corresponds to a dynamic range DR of the OPS 200. The dynamic range DR is dependent on the detection angle θ.

The fifth coefficient $K_5$ corresponds to a limit of detection (LOD) of the OPS 200. The LOD is dependent on the detection angle θ.

Next, the computing device 100 determines a plurality of ratings $Q_0$-$Q_k$ for the OPS 200 using the at least two of the coefficients $K_1$-$K_5$ and at least two of (i) the first sensitivity $S_1$, (ii) the second sensitivity $S_2$, (iii) the degree of monotonicity M, (iv) the dynamic range DR, or (v) the LOD. That is, in various embodiments, the computing device 100 uses any two, any three, any four, or all five of (i)-(v) to determine the plurality of ratings $Q_0$-$Q_k$. The plurality of ratings $Q_0$-$Q_k$ correspond respectively to a plurality of detection angles $θ_0$-$θ_k$.

The computing device 100 can also identify a detection angle $θ_x$ of the plurality of detection angles $θ_0$-$θ_k$ that corresponds to a maximum rating of the plurality of ratings $Q_0$-$Q_k$ or a minimum rating of the plurality of ratings $Q_0$-$Q_k$. Additionally, a technician can provide (e.g., build) the OPS 200 having a detection angle $θ_a$ that is within 5 degrees of the identified detection angle $θ_x$ (e.g., substantially equal to the identified detection angle $θ_x$).

In a more detailed example, one might be interested in finding a desirable detection angle $θ_x$ for the OPS 200 for a given use case. For example, the use case might involve detecting the concentration and size/diameter of ambient particles ranging in size from 0.1 μm to 10 μm. Referring to equation 300, the computing device 100 can receive input 302 that respectively indicates values for each of $K_1$, $K_2$, $K_3$, $K_4$, and $K_5$. In one example, $K_1$=−1, $K_2$=−1, $K_3$=−1, $K_4$=0.3, and $K_5$=0.5. This generally would mean that the first sensitivity $S_1$, the second sensitivity $S_2$, and the degree of monotonicity M are considered more important for the particular use case than the dynamic range DR or the limit of detection LOD, because $|K_1|, |K_2|, |K_3| > |K_4|, |K_5|$.

Generally, one typical scenario is that the first coefficient $K_1$, the second coefficient $K_2$, and the third coefficient $K_3$ are less than or equal to zero, and the fourth coefficient $K_4$ and the fifth coefficient $K_5$ are greater than or equal to zero. In this scenario, the process involves finding the θ for which Q is maximized.

In another typical scenario, the first coefficient $K_1$, the second coefficient $K_2$, and the third coefficient $K_3$ are greater than or equal to zero, and the fourth coefficient $K_4$ and the fifth coefficient $K_5$ are less than or equal to zero. In this scenario, the process involves finding the θ for which Q is minimized.

The computing device 100 can calculate a rating $Q_0$ that corresponds to $θ_0$, based on the equation 300 and the assigned values for $K_1$-$K_5$ by the input 302. This involves calculating a series of scattering intensities R for $θ_0$ and for an arbitrary constant particle size d, that correspond respectively to discrete real parts of CRI (e.g., ranging from 1.3 to 2.0). The computing device 100 could calculate scattering intensities R for any number of discrete values of real parts of CRI (e.g., at regular intervals) between 1.3 and 2.0, for example. The computing device 100 can also calculate the standard deviation of the scattering intensities R divided by the mean of the scattering intensities R. The first sensitivity $S_1$ is equal to this ratio of the standard deviation to the mean that is associated with the real part of the CRI. A high first sensitivity $S_1$ is generally undesirable. The range of real parts of CRI ranging from 1.3 to 2.0 could correspond to a broad range of particles that one could expect to encounter in an urban, suburban, or rural area.

Additionally, the computing device 100 can calculate a series of scattering intensities R for $θ_0$ and for the arbitrary constant particle size d, that correspond respectively to discrete imaginary parts of CRI (e.g., ranging from 0 to 0.1). The computing device 100 could calculate scattering intensities R for any number of discrete values of imaginary parts of CRI (e.g., at regular intervals) between 0 and 0.1, for example. The computing device 100 can also calculate the standard deviation of the scattering intensities R divided by the mean of the scattering intensities R. The second sensitivity $S_2$ is equal to this ratio of the standard deviation to the mean that is associated with the imaginary part of the CRI. A high second sensitivity $S_2$ is generally undesirable as well. The range of imaginary parts of CRI ranging from 0 to 0.1 could correspond to a broad range of particles (e.g., black carbon particles from diesel engines) that one could expect to encounter in an urban, suburban, or rural area.

Additionally, the computing device 100 can calculate the degree of monotonicity M for $θ_0$ that is defined by a quantity of instances of non-monotonicity of R over a finite range of particle size (e.g., 0.1 μm to 10 μm). Instances of non-monotonicity of R occur for values of R that correspond to more than one particle size d (e.g., over the range 0.1 μm to 10 μm). M can be determined numerically. A high degree of monotonicity M is typically undesirable.

Also, the computing device 100 can calculate the dynamic range DR for $θ_0$, which is defined by a ratio of a maximum of the scattering intensity R to a minimum of the scattering intensity R over a finite range of particle size (e.g., 0.1 μm to 10 μm), a finite range of the real part of the CRI (e.g., 1.3 to 2.0), and a finite range of the imaginary part of the CRI (e.g., 0 to 0.1). That is, the dynamic range DR is the maximum value for R over the entire finite three-dimensional space defined by particle size, real part of CRI, and imaginary part of CRI.

Additionally, the computing device 100 can calculate the limit of detection LOD, which is a minimum scattering intensity that corresponds to a minimum particle size of the finite range of particle size, over the finite range of the real part of the CRI, and over the finite range of the imaginary part of the CRI. That is, the LOD is the minimum scattering intensity R corresponding to the lower end of the particle size range (e.g., 0.1 μm) over the two-dimensional space defined by real part of CRI and imaginary part of CRI.

Next, $Q_0$ is calculated and is equal to a sum of (I) a first multiplicative product of the first coefficient $K_1$ and the first sensitivity $S_1$, (II) a second multiplicative product of the second coefficient $K_2$ and the second sensitivity $S_2$, (III) a third multiplicative product of the third coefficient $K_3$ and the degree of monotonicity M, (IV) a fourth multiplicative product of the fourth coefficient $K_4$ and the dynamic range DR, and (V) a fifth multiplicative product of the fifth coefficient $K_5$ and the LOD. In embodiments where values of one or more of the coefficients $K_1$-$K_5$ are not included in the input 302, the corresponding products (I)-(V) are omitted from the sum. That is, the sum can be a sum of any two, any three, any four, or all five of (I)-(V).

After $Q_0$ is calculated, the computing device 100 can calculate $Q_1$ corresponding to $\theta_1$, $Q_2$ corresponding to $\theta_2$, $Q_3$ corresponding to $\theta_3$, and so on until $Q_k$ is calculated for $\theta_k$. The values $\theta_0$ to $\theta_k$ could be equally spaced within any range of angles such as 0 to 90 degrees or 30 to 70 degrees, for example. Once $Q_0$ to $Q_k$ is calculated, the computing device 100 either determines a minimum rating Q of the plurality of ratings $Q_0$ to $Q_k$ or a maximum rating Q of the plurality of ratings $Q_0$ to $Q_k$. The minimum rating Q corresponds to a desirable detection angle for the OPS 200 when K1, K2, and K3 are non-negative and K4 and K5 are non-positive. The maximum rating Q corresponds to a desirable detection angle for the OPS 200 when K1, K2, and K3 are non-positive and K4 and K5 are non-negative.

Lastly, the OPS 200 can be provided or built with the identified detection angle or with a detection angle that is within a specified range (e.g., 5 degrees) of the identified detection angle.

In some examples, the OPS 200 is a wearable device that could be attached to a person's clothing as that person goes about their normal day. The OPS 200 could be used to quantify particle exposure typical for that person's daily routine. In this example, some characteristics of the particles that will be encountered might be unknown. As such, the ratings could be calculated by considering a wide ranges of particle diameter, real part of CRI, and/or imaginary part of CRI.

In some examples, the user might be interested in a more specific type of particle that is expected to be encountered. For instance, a farmer might be interested in ambient pollen concentration and a relatively small range of imaginary CRI (e.g., Im(CRI)=0) could be used to optimize the OPS 200 using the method described herein. In another example, one might expect to encounter black carbon particles near a coal mine, and smaller ranges of real CRI, imaginary CRI, particle diameter etc. that correspond to typical black carbon particles could be used. In a clean room situation, the limit of detection (LOD) might be the most important parameter and could be weighted accordingly.

FIG. 4 is a block diagram of a method 400 that can be performed, at least in part, by the computing device 100. As shown in FIG. 4, the method 400 includes one or more operations, functions, or actions as illustrated by blocks 402, 404, 406, and 408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, the method 400 includes receiving the input 302 indicating at least two of (a)-(e). (a) is the first coefficient $K_1$ corresponding to the first sensitivity $S_1$ of the optical particle sizer (OPS) 200 to a real part of a complex refractive index (CRI) of the particle 210 under test. The first sensitivity $S_1$ is dependent on the detection angle $\theta$ defined by the central axis 206 of the OPS 200 and the detection axis 216 of a detector 212 of the OPS 200. (b) is the second coefficient $K_2$ corresponding to the second sensitivity $S_2$ of the OPS 200 to an imaginary part of the CRI. The second sensitivity $S_2$ is dependent on the detection angle $\theta$. (c) is the third coefficient $K_3$ corresponding to a degree of monotonicity M between scattering intensity R detected by the OPS 200 and a size d of the particle 210 under test. The degree of monotonicity M is dependent on the detection angle $\theta$. (d) is the fourth coefficient $K_4$ corresponding to the dynamic range DR of the OPS 200. The dynamic range DR is dependent on the detection angle $\theta$. (e) is the fifth coefficient $K_5$ corresponding to the limit of detection (LOD) of the OPS 200. The LOD is dependent on the detection angle $\theta$.

At block 404, the method 400 includes determining the plurality of ratings $Q_0$-$Q_k$ for the OPS 200 using the at least two of (a)-(e) and the at least two of (i) the first sensitivity $S_1$, (ii) the second sensitivity $S_2$, (iii) the degree of monotonicity M, (iv) the dynamic range DR, or (v) the LOD. The plurality of ratings $Q_0$-$Q_k$ correspond respectively to the plurality of detection angles $\theta_0$-$\theta_k$.

At block 406, the method 400 includes identifying the detection angle $\theta_x$ of the plurality of detection angles $\theta_0$-$\theta_k$ that corresponds to the maximum rating of the plurality of ratings $Q_0$-$Q_k$ or the minimum rating of the plurality of ratings $Q_0$-$Q_k$.

At block 408, the method 400 includes providing the OPS 200 having a detection angle that is within 5 degrees of the identified detection angle $\theta_x$.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:
   receiving input indicating at least two of:
   (a) a first coefficient corresponding to a first sensitivity of an optical particle sizer (OPS) to a real part of a complex refractive index (CRI) of a particle under test, wherein the first sensitivity is dependent on a detection angle defined by a central axis of the OPS and a detection axis of a detector of the OPS;
   (b) a second coefficient corresponding to a second sensitivity of the OPS to an imaginary part of the CRI, wherein the second sensitivity is dependent on the detection angle;
   (c) a third coefficient corresponding to a degree of monotonicity between scattering intensity detected by the OPS and a size of the particle under test, wherein the degree of monotonicity is dependent on the detection angle;
   (d) a fourth coefficient corresponding to a dynamic range of the OPS, wherein the dynamic range is dependent on the detection angle; or
   (e) a fifth coefficient corresponding to a limit of detection (LOD) of the OPS, wherein the LOD is dependent on the detection angle;
   determining a plurality of ratings for the OPS using the at least two of (a)-(e) and at least two of (i) the first sensitivity, (ii) the second sensitivity, (iii) the degree of monotonicity, (iv) the dynamic range, or (v) the LOD, wherein the plurality of ratings correspond respectively to a plurality of detection angles;

identifying a detection angle of the plurality of detection angles that corresponds to a maximum rating of the plurality of ratings or a minimum rating of the plurality of ratings; and providing an OPS having a detection angle that is within 5 degrees of the identified detection angle.

2. The method of claim 1, wherein providing the OPS comprises providing the OPS such that the detection angle of the OPS is substantially equal to the identified detection angle.

3. The method of claim 1, wherein each rating of the plurality of ratings is equal to a sum of at least two of (I) a first multiplicative product of the first coefficient and the first sensitivity, (II) a second multiplicative product of the second coefficient and the second sensitivity, (III) a third multiplicative product of the third coefficient and the degree of monotonicity, (IV) a fourth multiplicative product of the fourth coefficient and the dynamic range, or (V) a fifth multiplicative product of the fifth coefficient and the LOD.

4. The method of claim 3, wherein the at least two of (I)-(V) comprises three of (I)-(V).

5. The method of claim 3, wherein the at least two of (I)-(V) comprises four of (I)-(V).

6. The method of claim 3, wherein the at least two of (I)-(V) comprises each of (I)-(V).

7. The method of claim 3, wherein the first coefficient, the second coefficient, and the third coefficient are less than or equal to zero, and the fourth coefficient and the fifth coefficient are greater than or equal to zero.

8. The method of claim 3, wherein the first coefficient, the second coefficient, and the third coefficient are greater than or equal to zero, and the fourth coefficient and the fifth coefficient are less than or equal to zero.

9. The method of claim 1,
wherein the at least two of (a)-(e) comprises three of (a)-(e), and
wherein the at least two of (i)-(v) comprises three of (i)-(v).

10. The method of claim 1,
wherein the at least two of (a)-(e) comprises four of (a)-(e), and
wherein the at least two of (i)-(v) comprises four of (i)-(v).

11. The method of claim 1,
wherein the at least two of (a)-(e) comprises each of (a)-(e), and
wherein the at least two of (i)-(v) comprises each of (i)-(v).

12. The method of claim 1, wherein the first sensitivity is defined for real parts of the CRI that are greater than or equal to 1.3 and less than or equal to 2.0 and the second sensitivity is defined for imaginary parts of the CRI that are greater than or equal to 0 and less than or equal to 0.1.

13. The method of claim 1, wherein the first sensitivity is defined by a ratio of (1) a standard deviation of the scattering intensity over a finite range of the real part of the CRI to (2) a mean of the scattering intensity over the finite range of the real part of the CRI.

14. The method of claim 1, wherein the second sensitivity is defined by a ratio of (1) a standard deviation of the scattering intensity over a finite range of the imaginary part of the CRI to (2) a mean of the scattering intensity over the finite range of the imaginary part of the CRI.

15. The method of claim 1, wherein the degree of monotonicity is defined by a quantity of instances of non-monotonicity over a finite range of particle size.

16. The method of claim 1, wherein the dynamic range is defined by a ratio of a maximum of the scattering intensity to a minimum of the scattering intensity over a finite range of particle size, a finite range of the real part of the CRI, and a finite range of the imaginary part of the CRI.

17. The method of claim 16, wherein the finite range of particle size is 0.1 μm to 10 μm.

18. The method of claim 16, wherein the LOD is a minimum scattering intensity that corresponds to a minimum particle size of the finite range of particle size, over the finite range of the real part of the CRI and over the finite range of the imaginary part of the CRI.

19. A computing device comprising:
one or more processors; and
a computer readable medium storing instructions that, when executed by the one or more processors, cause the computing device to perform functions comprising:
receiving input indicating at least two of:
(a) a first coefficient corresponding to a first sensitivity of an optical particle sizer (OPS) to a real part of a complex refractive index (CRI) of a particle under test, wherein the first sensitivity is dependent on a detection angle defined by a central axis of the OPS and a detection axis of a detector of the OPS;
(b) a second coefficient corresponding to a second sensitivity of the OPS to an imaginary part of the CRI, wherein the second sensitivity is dependent on the detection angle;
(c) a third coefficient corresponding to a degree of monotonicity between scattering intensity detected by the OPS and a size of the particle under test, wherein the degree of monotonicity is dependent on the detection angle;
(d) a fourth coefficient corresponding to a dynamic range of the OPS, wherein the dynamic range is dependent on the detection angle; or
(e) a fifth coefficient corresponding to a limit of detection (LOD) of the OPS, wherein the LOD is dependent on the detection angle;
determining a plurality of ratings for the OPS using the at least two of (a)-(e) and at least two of (i) the first sensitivity, (ii) the second sensitivity, (iii) the degree of monotonicity, (iv) the dynamic range, or (v) the LOD, wherein the plurality of ratings correspond respectively to a plurality of detection angles; and
identifying a detection angle of the plurality of detection angles that corresponds to a maximum rating of the plurality of ratings or a minimum rating of the plurality of ratings.

20. A non-transitory computer readable medium storing instructions that, when executed by a computing device, cause the computing device to perform functions comprising:
receiving input indicating at least two of:
(a) a first coefficient corresponding to a first sensitivity of an optical particle sizer (OPS) to a real part of a complex refractive index (CRI) of a particle under test, wherein the first sensitivity is dependent on a detection angle defined by a central axis of the OPS and a detection axis of a detector of the OPS;
(b) a second coefficient corresponding to a second sensitivity of the OPS to an imaginary part of the CRI, wherein the second sensitivity is dependent on the detection angle;
(c) a third coefficient corresponding to a degree of monotonicity between scattering intensity detected by the OPS and a size of the particle under test, wherein the degree of monotonicity is dependent on the detection angle;

(d) a fourth coefficient corresponding to a dynamic range of the OPS, wherein the dynamic range is dependent on the detection angle; or (e) a fifth coefficient corresponding to a limit of detection (LOD) of the OPS, wherein the LOD is dependent on the detection angle;

determining a plurality of ratings for the OPS using the at least two of (a)-(e) and at least two of (i) the first sensitivity, (ii) the second sensitivity, (iii) the degree of monotonicity, (iv) the dynamic range, or (v) the LOD, wherein the plurality of ratings correspond respectively to a plurality of detection angles; and identifying a detection angle of the plurality of detection angles that corresponds to a maximum rating of the plurality of ratings or a minimum rating of the plurality of ratings.

* * * * *